(12) United States Patent
Durkovic et al.

(10) Patent No.: US 10,144,260 B2
(45) Date of Patent: Dec. 4, 2018

(54) AXLE FOR WHEELS OF A DOUBLE-TRACKED MOTOR VEHICLE, AND DOUBLE-TRACKED MOTOR VEHICLE HAVING AN AXLE OF THIS TYPE

(71) Applicant: Bayerische Motoren Werke Aktiengesellschaft, Munich (DE)

(72) Inventors: Martin Durkovic, Munich (DE); Markus Brenner, Moegglingen (DE); Sven Gerber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/599,153

(22) Filed: May 18, 2017

(65) Prior Publication Data

US 2017/0253099 A1    Sep. 7, 2017

Related U.S. Application Data

(63) Continuation of application No. PCT/EP2015/074053, filed on Oct. 16, 2015.

(30) Foreign Application Priority Data

Nov. 19, 2014    (DE) .................. 10 2014 223 619

(51) Int. Cl.
*B60G 11/08*    (2006.01)
*B60G 3/26*    (2006.01)
(Continued)

(52) U.S. Cl.
CPC .............. *B60G 11/08* (2013.01); *B60G 3/06* (2013.01); *B60G 3/265* (2013.01); *B60G 7/005* (2013.01);
(Continued)

(58) Field of Classification Search
CPC ...... B60G 11/08; B60G 99/002; B60G 3/265; B60G 2200/342; B60G 2202/114; B60G 2204/121
See application file for complete search history.

(56) References Cited

U.S. PATENT DOCUMENTS 2,756,067 A * 7/1956 Porsche ................ B60G 3/207
                                                    267/222
4,615,537 A * 10/1986 Damon ................... F16F 9/366
                                                    188/321.11
(Continued)

FOREIGN PATENT DOCUMENTS

DE        1 480 405       4/1969
DE        1 924 175       11/1969
(Continued)

OTHER PUBLICATIONS

Popp et al., Stossdaempferanordnung fuer angetriebene,durch Querblattfedern abgefederte Achsen von Kraftfahrzeugen, Apr. 24, 1969, EPO, DE 1 480 405 A1, Machine Translation of Description (Year: 1969).*

(Continued)

*Primary Examiner* — James A English
(74) *Attorney, Agent, or Firm* — Crowell & Moring LLP

(57) ABSTRACT

The invention provides an axle for wheels of a two-track motor vehicle. The axle has, on each vehicle side, a wheel carrier, a damper strut, a transverse link and a transverse leaf spring which controls the wheel at least partially laterally and/or in the vehicle longitudinal direction. The damper strut has a damper tube and a damper piston which can be moved in the damper tube along a damper longitudinal axis. The damper strut is attached by the damper tube to the wheel carrier. The transverse link is attached by a wheel-carrier-side end region to the wheel carrier. The transverse leaf spring extends substantially in the vehicle transverse direc- (Continued)

tion and has at least one wheel-carrier-side end region. The transverse leaf spring is attached by the wheel-carrier-side end region thereof to the damper strut and is supported on the damper strut.

17 Claims, 11 Drawing Sheets

(51) Int. Cl.
*B60G 13/00* (2006.01)
*B60G 15/06* (2006.01)
*B60G 3/06* (2006.01)
*B60G 7/00* (2006.01)
*B60G 99/00* (2010.01)

(52) U.S. Cl.
CPC ........ *B60G 13/006* (2013.01); *B60G 15/06* (2013.01); *B60G 99/002* (2013.01); *B60G 2200/342* (2013.01); *B60G 2202/114* (2013.01); *B60G 2204/121* (2013.01); *B60G 2204/129* (2013.01)

(56) References Cited

U.S. PATENT DOCUMENTS

| 4,854,606 | A | | 8/1989 | de Goncourt et al. | |
| 4,871,187 | A | | 10/1989 | Schaible | |
| 4,944,524 | A | * | 7/1990 | Achenbach | B60G 3/205 267/221 |
| 5,251,930 | A | | 10/1993 | Kusaka et al. | |
| 5,988,660 | A | * | 11/1999 | Tattermusch | B60G 3/28 267/246 |
| 6,390,486 | B1 | | 5/2002 | Boes et al. | |
| 9,421,837 | B2 | * | 8/2016 | Lake | B60G 11/10 |
| 9,656,528 | B2 | * | 5/2017 | Perri | B60G 11/08 |
| 2002/0000703 | A1 | | 1/2002 | Lawson et al. | |
| 2013/0099462 | A1 | * | 4/2013 | Ehrlich | B60G 21/051 280/124.116 |
| 2015/0102575 | A1 | * | 4/2015 | Lake | B60G 11/10 280/124.107 |

FOREIGN PATENT DOCUMENTS

| DE | 25 41 841 A1 | 3/1977 |
| DE | 42 01 180 A1 | 7/1992 |
| DE | 41 40 236 A1 | 4/1993 |
| DE | 198 01 668 B4 | 6/2005 |
| DE | 10 2007 051 470 A1 | 4/2009 |
| DE | 10 2011 006 874 A1 | 10/2012 |
| DE | 10 2012 221 678 A1 | 5/2014 |
| DE | 10 2014 223 576 A1 | 5/2016 |
| DE | 10 2014 223 584 A1 | 5/2016 |
| DE | 10 2014 223 600 A1 | 5/2016 |
| EP | 0 251 850 A1 | 1/1988 |
| EP | 0 312 711 A2 | 4/1989 |
| EP | 0 318 753 B1 | 1/1992 |
| EP | 0 630 770 A1 | 12/1994 |
| EP | 1 080 953 A1 | 3/2001 |
| EP | 2 540 533 A2 | 1/2013 |
| FR | 2 675 431 A1 | 10/1992 |
| JP | 4-193616 A | 7/1992 |
| JP | 10-6726 A | 1/1998 |

OTHER PUBLICATIONS

Scholz et al., Damper strut axle connected to wheel carrier of motor car, has transverse plate spring that is provided to generate bending moment which counteracts with wheel rebellion force, May 28, 2014, EPO, DE 10 2012 221 678 A1, Machine Translation of Description (Year: 2012).*

International Search Report (PCT/ISA/210) issued in PCT Application No. PCT/EP2015/074053 dated Feb. 19, 2016 with English translation (seven pages).

German-language Written Opinion (PCT/ISA/237) issued in PCT Application No. PCT/EP2015/074053 dated Feb. 19, 2016 (six pages).

German Search Report issued in counterpart German Application No. 10 2014 223 619.3 dated Sep. 2, 2015 with partial English translation (10 pages).

* cited by examiner

AXLE FOR WHEELS OF A
DOUBLE-TRACKED MOTOR VEHICLE,
AND DOUBLE-TRACKED MOTOR VEHICLE
HAVING AN AXLE OF THIS TYPE

CROSS REFERENCE TO RELATED
APPLICATIONS

This application is a continuation of PCT International Application No. PCT/EP2015/074053, filed Oct. 16, 2015, which claims priority under 35 U.S.C. § 119 from German Patent Application No. 10 2014 223 619.3, filed Nov. 19, 2014, the entire disclosures of which are herein expressly incorporated by reference.

BACKGROUND AND SUMMARY OF THE
INVENTION

The invention relates to an axle for wheels of a two-track (or double-tracked) motor vehicle, wherein the axle has, on each side of the vehicle, a wheel carrier, a damper strut, a transverse link and a transverse leaf spring which imparts an at least partial wheel-controlling action laterally and/or in a vehicle longitudinal direction. The damper strut has a damper tube and a damper piston which is movable in the damper tube along a damper longitudinal axis. The damper strut is attached by the damper tube to the wheel carrier and is supported at a first effective kinematic point on the wheel carrier. The transverse link has a wheel-carrier-side end region and is attached by the wheel-carrier-side end region to the wheel carrier and is supported at a second effective kinematic point on the wheel carrier. With regard to a functionally installed state of the axle in a two-track motor vehicle, the transverse leaf spring extends substantially in a vehicle transverse direction and has at least one wheel-carrier-side end region.

Axles for two-track motor vehicles with transverse leaf springs, that is to say with leaf springs running substantially in a vehicle transverse direction, in particular with transverse leaf springs whose spring leaves are, with regard to a functionally installed state in a vehicle, arranged one above the other in a vehicle vertical direction are generally known from the prior art, for example, from DE 41 40 236 A1, DE-OS 25 41 841 or DE 10 2007 051 470 A1.

Here, a basic distinction is made between transverse leaf springs which impart a wheel-controlling action, that is to say transverse leaf springs which support occurring forces, and transverse leaf springs which do not impart a wheel-controlling action, that is to say transverse leaf springs which are mounted in a correspondingly flexible fashion. In particular, a distinction is made between transverse leaf springs which impart a wheel-controlling action laterally or which do not impart a wheel-controlling action laterally, and transverse leaf springs which impart a wheel-controlling action in the vehicle longitudinal direction and transverse leaf springs which do not impart a wheel-controlling action in the vehicle longitudinal direction, that is to say transverse leaf springs which support occurring transverse or lateral forces and are mounted in a flexible fashion in the vehicle transverse direction, and transverse leaf springs which support occurring longitudinal forces and are mounted in a flexible fashion in the vehicle longitudinal direction.

The expression "which impart a partial wheel-controlling action (laterally and/or in a longitudinal direction)" is used to refer to transverse leaf springs which accommodate or support only a part of the wheel-controlling forces acting laterally or in the longitudinal direction, and/or which support forces acting laterally or in the longitudinal direction only in certain driving situations. That is to say, a transverse leaf spring which imparts a partial wheel-controlling action (laterally and/or in a longitudinal direction) is mounted, in particular attached to the vehicle body and to the wheel suspension arrangement, such that, by the transverse leaf spring, only a part of the forces (lateral and/or longitudinal forces) can be supported, and/or the forces (lateral and/or longitudinal forces) can be supported only in certain driving situations.

The aforementioned DE 41 40 236 A1 and DE-OS 25 41 841 each disclose a transverse leaf spring axle for a two-track motor vehicle, which transverse leaf spring axle has a transverse leaf spring which imparts a wheel-controlling action laterally and in a longitudinal direction and which is supported at two mutually spaced-apart points on the vehicle body. Here, the transverse leaf spring is attached by its ends, that is to say at the wheel carrier side, in each case rigidly, in particular dimensionally rigidly, to a lower transverse link, that is to say the transverse leaf spring connects the left-hand lower transverse link to the right-hand lower transverse link.

It emerges from DE 10 2007 051 470 A1 that the support of the lateral forces on the vehicle body via the transverse leaf spring can be achieved, for example, by virtue of the transverse leaf spring being attached to the vehicle body, for the purposes of supporting the acting lateral forces, by two eccentric bearings which are approximately rigid in a vehicle transverse direction, and secondly being attached to or supported on the wheel carrier with such rigidity, for example, by a fixed screw connection by one or more screws or by a coupling element in the form of a correspondingly designed rubber bearing, so as to act similarly to a transverse link and thus impart a wheel-controlling action laterally. Owing to the rigid attachment of the leaf spring in the vehicle longitudinal direction, too, the leaf spring also imparts a wheel-controlling action in the longitudinal direction.

Such transverse leaf spring axles are in this case suitable in particular for axles which are constructed in accordance with the principle of a spring strut axle, in particular for axles which are constructed in accordance with the principle of a MacPherson spring strut axle, that is to say with damper struts which are supported in each case at the wheel side on the wheel carrier but which, instead of a spring strut, have only a damper strut, that is to say which have no helical spring arranged around the damper strut. In this case, the spring function can be performed by the transverse leaf spring. That is to say, the helical spring, which is commonly also referred to as a supporting spring, can be omitted.

The omission of the helical spring, however, basically has the disadvantage, in relation to a classic MacPherson spring strut axle, that the transverse forces acting on the damper strut owing to an occurring wheel load can no longer be compensated, because the transverse force compensation is generally achieved by virtue of the helical spring, along its longitudinal axis, also referred to as supporting spring axis, being inclined slightly obliquely relative to the damper axis, such that the damper piston, during compression and rebound movements, at least in certain driving situations, can be moved in the damper tube along the damper axis virtually without transverse forces and, as a result, with less friction than without transverse force compensation.

A further basic problem occurs in the case of axles with transverse leaf springs which impart an at least partial wheel-controlling action (laterally and/or in a longitudinal direction) and which are attached by their ends in each case in substantially rigid fashion to a lower transverse link. During the compression and/or rebound movement of the wheel, the articulated connection by which the transverse leaf spring is attached to the transverse link kinematically follows both the movement of the transverse leaf spring and that of the lower transverse link, even though the transverse link and the end of the transverse leaf spring actually move on different paths, because the transverse link and the transverse leaf spring rotate in each case about different attachment points. During the compression and rebound movements, the transverse link moves about its vehicle-body-side attachment point, and the transverse leaf spring rotates about the adjacently situated attachment point on the vehicle body, which does not coincide with the vehicle-body-side attachment point of the lower transverse link.

Since the transverse leaf spring is, however, rigidly connected to the transverse link and the rigidity of the transverse link in its longitudinal direction, that is to say over its length, is generally considerably greater than the rigidity of the transverse leaf spring, the forces that occur during compression and rebound movements generally result in a lengthening of the transverse leaf spring, such that the latter is forcibly guided along the path of the transverse link. This results in distortion of the transverse leaf spring, which is intensified with increasing compression or rebound travel because, with increasing compression and rebound travel, the actual path difference increases. For optimum driving behavior, it is, however, important that the transverse leaf spring can move as far as possible without distortion, in particular can bend as far as possible without distortion, during the compression and rebound movements. As a result, an axle in which the transverse leaf spring is rigidly attached to the lower transverse link for the purposes of supporting occurring lateral forces does not exhibit optimum bending behavior.

It is thus an object of the present invention to provide an axle having a transverse leaf spring, which imparts an at least partial wheel-controlling action laterally and/or in the vehicle longitudinal direction, for a two-track vehicle. It is also an object to provide a two-track vehicle having a corresponding axle, which firstly exhibits the most optimum possible bending behavior, that is to say whose transverse leaf spring is distorted to the least possible extent during compression and rebound movements, and which, in relation to the axles known from the prior art, permits improved compensation of the transverse forces which act on the damper strut and which increase the friction thereof.

This and other objects are achieved by an axle in accordance of embodiments of the invention and/or by a two-track motor vehicle having such an axle in accordance of embodiments of the invention. Advantageous and preferred embodiments of the invention are the subject of the claims and will be discussed in more detail below. The wording of the claims is incorporated by express reference into the content of the description.

An axle according to the invention is characterized in that the transverse leaf spring is attached by its wheel-carrier-side end region to the damper strut and is supported at a third effective kinematic point on the damper strut.

That is to say, in the case of an axle according to the invention, the left-hand damper strut and the right-hand damper strut are coupled to one another by the transverse leaf spring, in particular are connected to one another by the transverse leaf spring. The transverse leaf spring, which extends substantially in a vehicle transverse direction, that is to say in a y-direction, may in this case be formed in one piece over its length, that is to say may extend approximately from the left-hand wheel carrier to the right-hand wheel carrier, or may, in a manner known from the prior art, be of multi-part form, that is to say may be assembled from multiple transverse leaf spring parts in the vehicle transverse direction.

Here, an axle according to the invention is basically constructed in the manner of a spring strut axle, in particular in the manner of a MacPherson spring strut axle, but the helical springs arranged around the damper strut in the case of spring strut axles can be omitted. That is to say, an axle according to the invention preferably has only a damper strut on each side of the vehicle. As a result, such axles are generally less complex, and in many cases require less structural space than other spring strut axles. Furthermore, transverse leaf spring axles commonly have a weight advantage in relation to spring strut axles.

It is self-evidently also contemplated for an axle according to the invention to be provided with a spring strut on each side of the vehicle rather than a damper strut. However, for an optimum spring characteristic of an axle of said type, careful coordination of the individual spring elements with one another is necessary.

The transverse leaf spring of an axle according to the invention is in this case designed to impart an at least partial wheel-controlling action laterally and/or to impart an at least partial wheel-controlling action in the vehicle longitudinal direction. That is to say, by the transverse leaf spring of an axle according to the invention, at least a part of the lateral forces and/or at least a part of the longitudinal forces can be supported, and/or the lateral forces and/or the longitudinal forces can be supported in certain driving situations.

The transverse leaf spring may, however, also be designed to impart a wheel-controlling action laterally and/or to impart a wheel-controlling action in the vehicle longitudinal direction, that is to say such that all occurring lateral forces and/or all occurring longitudinal forces can be supported by the transverse leaf spring.

By the manner in which the transverse leaf spring can be attached to the vehicle body and the manner in which the transverse leaf spring is attached to the damper strut, that is to say the manner in which the corresponding attachments of the transverse leaf spring are configured, the transverse leaf spring acts as a transverse leaf spring which imparts a wheel-controlling action laterally and/or in the vehicle longitudinal direction or as a transverse leaf spring which imparts a partial wheel-controlling action laterally and/or in the vehicle longitudinal direction.

Here, an axle according to the invention may be formed either as a front axle or as a rear axle, wherein the axle may in each case be formed as a steerable or non-steerable axle.

If an axle according to the invention is formed as a steerable axle, the first and second kinematic points are preferably arranged so as to define a steering axis, that is to say the axis about which the wheel rotates during a steering movement.

The transverse leaf spring of an axle according to the invention may have one spring leaf or multiple spring leaves or one or more spring layers, wherein the transverse leaf spring preferably has multiple spring leaves arranged in particular parallel and one above the other, which spring leaves particularly preferably form a leaf spring pack. The transverse leaf spring is in this case preferably arranged such that, with regard to a functionally installed state in a vehicle, the spring leaves are arranged substantially one above the other in the vehicle vertical direction. That is to say, the individual spring leaves are preferably stacked approximately in a z-direction, preferably parallel and one above the other. The transverse leaf spring may, however, also be arranged in a slightly inclined manner, that is to say so as to be inclined slightly about the y-axis, such that bending of the transverse leaf spring is effected not only by vertical forces, but also by longitudinal forces, albeit preferably only to a much smaller extent.

The geometry of the individual spring leaves, in particular the shape thereof and the thickness and cross-sectional profile thereof in a vehicle transverse direction, is in this case preferably selected, and the leaf spring packs are preferably assembled in a coordinated fashion with respect to one another, such that the desired spring characteristic is obtained.

Here, the spring leaves may be produced from conventional spring steel, or else from fiber-reinforced plastic or the like. It is self-evidently also possible for a leaf spring pack, or the entire transverse leaf spring, to be assembled from multiple spring leaves composed of different materials.

With an axle according to the invention, it is firstly possible for transverse forces which act on the damper strut and which adversely affect the friction to be reduced in relation to transverse leaf spring axles known from the prior art, in which the transverse leaf spring is supported on the lower transverse link. Furthermore, as a result of the decoupling of the transverse leaf spring from the transverse link, in particular as a result of the attachment of the transverse leaf spring to the damper strut rather than to the transverse link, distortion of the transverse leaf spring during the compression and rebound movements can be avoided, even in the case of a transverse leaf spring which imparts a wheel-controlling action laterally and/or in the vehicle longitudinal direction.

In a preferred embodiment of the invention, the transverse leaf spring is attached by its wheel-carrier-side end region to the damper strut in the region of the damper tube, preferably in the region of a lower end of the damper tube or in the region of an upper end of the damper tube.

Since, in a functionally installed state in which the damper strut is attached by its upper end to the vehicle body, a transverse force which is exerted on the damper strut via the first kinematic point at which the damper strut is attached to the wheel carrier is supported both on the upper end of the damper piston and via the transverse leaf spring, the magnitude of the transverse force which acts on the damper piston and which increases the friction is dependent on the height or the position of the attachment of the transverse leaf spring to the damper strut. That is to say, what is of importance is at what height of the damper strut, that is to say where on the damper strut over its length, the third kinematic point, at which the transverse leaf spring is attached to the damper strut, is situated.

That is to say, depending on where the transverse leaf spring is attached to the damper strut, a transverse force acting on the damper strut is supported to a greater or lesser extent via the transverse leaf spring rather than via the damper piston, which is attached by its upper end to the vehicle body in a functionally installed state. The closer the third kinematic point is situated to the first kinematic point, the lower the transverse force acting on the damper piston, because a greater fraction can be supported by the transverse leaf spring, that is to say the better the transverse force compensation.

In a particularly preferred embodiment, in a vehicle vertical direction with regard to a functionally installed state of the axle in a motor vehicle, the transverse leaf spring is attached to the damper strut at the level of the first effective kinematic point, wherein preferably, the third kinematic point is situated at the height of the first kinematic point. In the case of such an attachment, the transverse force acting on the damper strut is supported virtually entirely by the transverse leaf spring, such that virtually no transverse force acts on the damper piston and an increase of the friction in the damper strut can be virtually avoided.

In particular, if the attachment of the transverse leaf spring to the damper strut at the height of the first kinematic point is not possible, for example because no structural space is available, it may be advantageous if the transverse leaf spring is attached under preload to the damper strut, and with regard to a functionally installed state of the axle in a motor vehicle, preferably under preload with a counter moment which acts about a vehicle longitudinal axis and which at least partially counteracts a transverse force generated owing to occurring wheel loads and directed toward the vehicle center and running through the first effective kinematic point and acting on the damper strut. With such a counter moment, a force component directed counter to the transverse force is generated at the attachment point of the damper piston, resulting in a lower resulting transverse force. With a correspondingly selected, defined preload, the transverse force can in certain situations even be completely compensated. The preload required for this purpose is in this case dependent, inter alia, on the position of the attachment point of the transverse leaf spring on the damper strut, that is to say on the arrangement of the third kinematic point.

In a preferred embodiment, the transverse leaf spring is articulately attached to the damper strut, particularly preferably by a joint. Here, the joint is preferably a ball joint or a rotary joint which permits an attachment under preload, in particular an attachment under preload with a counter moment which acts about a vehicle longitudinal axis and which at least partially counteracts a transverse force generated owing to occurring wheel loads and directed toward the vehicle center and running through the first effective kinematic point and acting on the damper strut.

The attachment of the transverse leaf spring to the damper strut is in this case designed in each case in accordance with the forces to be supported, that is to say such that the transverse leaf spring imparts an at least partial wheel-controlling action laterally and/or in the vehicle longitudinal direction.

In a particularly preferred refinement, the transverse leaf spring itself forms a joint, wherein, for this purpose, the wheel-carrier-side end region of the transverse leaf spring is in the form of a joint. For this purpose, the transverse leaf spring may, for example, be of angled design in its end region and mounted with its angled end on the damper strut such that, in the region, the transverse leaf spring forms a type of hinge joint. With a transverse leaf spring of this type or an attachment of this type, the transverse leaf spring can be attached under preload to the damper strut particularly easily. Alternatively, it is, however, self-evidently also possible for a separate hinge joint or the like to be used.

Alternatively or in addition, the transverse force acting on the damper piston can be reduced by virtue of the damper strut being attached by the damper tube under preload to the wheel carrier, and with regard to a functionally installed state of the axle in a motor vehicle, preferably under preload with a counter moment which acts about a vehicle longitudinal axis and which at least partially counteracts a transverse force generated owing to occurring wheel loads and directed toward the vehicle center and running through the first effective kinematic point and acting on the damper strut. This type of attachment of the damper strut under a corresponding preload to the wheel carrier has the advantage that the damper does not introduce into it any force which has to be supported as completely as possible by the transverse leaf spring or which has to be compensated by a corresponding preload in the attachment of the transverse leaf spring to the damper strut.

As mentioned in the introduction, an axle according to the invention has a transverse leaf spring which imparts an at least partial wheel-controlling action laterally and/or in the vehicle longitudinal direction. The manner in which the transverse leaf spring can be attached to the vehicle body and the manner in which the transverse leaf spring is attached to the damper strut, that is to say the manner in which the corresponding attachments of the transverse leaf spring are designed, determines whether the transverse leaf spring acts as a transverse leaf spring which imparts a wheel-controlling action laterally and/or in the vehicle longitudinal direction or as a transverse leaf spring which imparts a partial wheel-controlling action laterally and/or in the vehicle longitudinal direction.

Since, for the best possible harmonic spring characteristic in the vehicle transverse direction, the transverse leaf spring itself should be attached in as flexible a manner as possible at least within certain defined limits, that is to say in such a way that a lateral compensation movement or a lateral displacement of the transverse leaf spring in the y-direction is possible, which opposes support of occurring lateral forces, it may in some cases be necessary for additional measures to be provided which firstly permit the lateral displacement of the transverse leaf spring within certain defined limits, such as is necessary for a good spring characteristic, but which at the same time permit support of occurring lateral forces via the transverse leaf spring at least in certain driving situations.

In this case, what has proven to be particularly advantageous is an axle according to the invention which has in each case one wheel carrier and one damper strut on each side of the vehicle and one Watt linkage which is coupled to the transverse leaf spring and which can be coupled to the vehicle body. The two damper struts are coupled to one another by the transverse leaf spring, and the transverse leaf spring can be attached by at least one bearing to the vehicle body. Here, the bearing is designed for supporting the transverse leaf spring in a vehicle vertical direction and simultaneously permits a compensation of a movement of the transverse leaf spring in a vehicle transverse direction during compression and/or rebound movements. The Watt linkage is designed, coupled to the transverse leaf spring, and capable of being coupled to the vehicle body, such that, in a functionally installed state of the axle in a two-track motor vehicle, the Watt linkage prevents a movement of the transverse leaf springs in the vehicle transverse direction caused by forces acting on the transverse leaf springs, or limits the movement to a defined maximum admissible transverse movement.

A Watt linkage of this type is described in detail in DE 10 2014 223 600.2 (EM27932), filed by the same applicant on the same date, which is hereby expressly incorporated in its entirety into the content of this description.

If the Watt linkage is designed to be coupled to the transverse leaf spring and to be coupleable to the vehicle body so as to prevent a global movement of the transverse leaf spring in the vehicle transverse direction, the axle, in particular the Watt linkage, is preferably designed such that lateral forces acting on the transverse leaf spring are supported on the vehicle body. That is to say, in this case, the transverse leaf spring imparts a wheel-controlling action laterally and supports lateral forces, which are introduced into the axle via the wheels, virtually entirely on the vehicle body, and a global transverse movement, and thus the displacement of the entire transverse leaf spring in the vehicle transverse direction, is virtually entirely blocked by the Watt linkage. Only the bearing, by which the transverse leaf spring is supported directly on the vehicle body, permits a small compensation movement in the vehicle transverse direction within the bearing in order to permit bending of the transverse leaf spring as far as possible without distortion during compression and rebound movements.

By contrast, if the Watt linkage is designed to be coupled to the transverse leaf spring and to be coupleable to the vehicle body so as to limit a global movement of the transverse leaf spring in the vehicle transverse direction to a defined maximum admissible transverse movement, the axle, in particular the Watt linkage, is preferably designed such that, after the defined maximum admissible transverse movement of the transverse leaf spring is reached, lateral forces acting on the transverse leaf spring are supported on the vehicle body. In this case, the transverse leaf spring imparts only a partial wheel-controlling action laterally, in particular only when the maximum admissible transverse movement of the transverse leaf spring has been reached.

In this case, the transverse leaf spring may preferably be attached to the vehicle body such that, in a functionally installed state of the axle in a two-track motor vehicle, adequate displaceability in the y-direction is ensured, preferably such that the spring action of the transverse leaf spring is not impeded, wherein, for this purpose, the transverse leaf spring may be attached by at least one bearing to the vehicle body.

The bearing for coupling the transverse leaf spring to the vehicle body should in this case, in order to achieve the correspondingly desired spring action, be designed for supporting the transverse leaf spring in the vehicle vertical direction and permit compensation of a movement of the transverse leaf spring in the vehicle transverse direction during compression and/or rebound movements.

Depending on whether it is intended for longitudinal forces to be supported, that is to say whether the transverse leaf spring is intended to impart a wheel-controlling action in the longitudinal direction, or whether flexibility in the vehicle longitudinal direction, that is to say in the x-direction, is desired, the transverse leaf spring of an axle according to the invention may be attached to the vehicle body rigidly or with corresponding flexibility in the vehicle longitudinal direction.

Such bearings which permit compensation of a movement of the transverse leaf spring in the vehicle transverse direction during compression and/or rebound movements while simultaneously providing support in the vehicle vertical direction, possibly with corresponding flexibility or rigidity in the x-direction, are basically known from the prior art.

However, the bearings described in DE 10 2014 223 576.6 (EM28004), filed on the same date by the same applicant, have proven to be particularly suitable for the attachment of the transverse leaf spring of an axle according to the invention to the vehicle body. DE 10 2014 223 576.6 (EM28004) is hereby incorporated by express reference, in its entirety, into the content of the description.

The bearings described in DE 10 2014 223 584.7 (EM28029), likewise filed on the same date by the same applicant, have likewise proven to be particularly suitable for the attachment of the transverse leaf spring of an axle according to the invention to the vehicle body, wherein DE 10 2014 223 584.7 (EM28029) is hereby likewise incorporated by express reference, in its entirety, into the content of the description.

It is, however, preferably possible for the transverse leaf spring to be coupled to the vehicle body not only by a single bearing as described above, but by at least two such bearings, in particular two eccentrically arranged bearings, preferably by two bearings offset outward symmetrically with respect to the vehicle center. This type of attachment of a transverse leaf spring to the vehicle body, such as is basically known from the prior art, has the advantage that the transverse leaf spring simultaneously acts as a transverse stabilizer during a rolling movement. In this way, wheel load differences between the left-hand wheel and the right-hand wheel can be reduced, and the lateral force control potential of the axle can be increased in relation to an axle with only one transverse leaf spring bearing. It is self-evidently also possible, as is likewise known from the prior art, for two eccentric bearing pairs to be provided.

A two-track motor vehicle according to the invention is characterized in that it has an axle according to the invention.

The individual features may be realized in each case individually or severally in the form of sub-combinations in an embodiment of the invention and can form advantageous, independently patentable embodiments, for which protection is hereby claimed. All of the features and feature combinations mentioned above in the description and below in the description of the figures in conjunction with an axle according to the invention and/or shown in the figures alone apply in each case not only to the axle according to the invention, but also to a two-track motor vehicle according to the invention, and may be used in each case not only in the described feature combinations but also in other technically feasible combinations or individually.

Other objects, advantages and novel features of the present invention will become apparent from the following detailed description of one or more preferred embodiments when considered in conjunction with the accompanying drawings.

BRIEF DESCRIPTION OF THE DRAWINGS

Below, the invention will be described on the basis of five embodiments, wherein, for this purpose, the invention is schematically illustrated in the appended drawings.

Here.

DETAILED DESCRIPTION OF THE DRAWINGS

Figure 1:
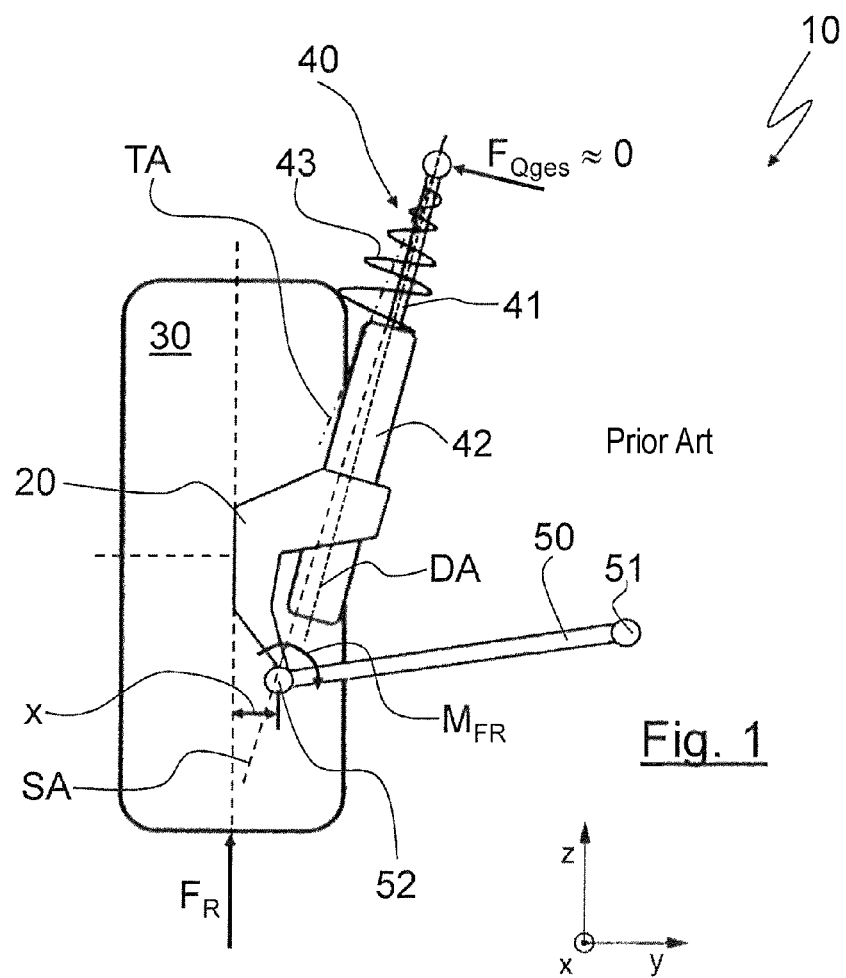
FIGS. 1 to 4 show, for improved understanding, axle concepts known from the prior art.

FIG. 1 shows a spring strut axle 10 known from the prior art, which has a wheel carrier 20 for holding a wheel 30 of the axle 10, on which wheel carrier there is supported a damper 40 with a damper tube 42 and with a damper piston 41 and with a helical spring 43 or supporting spring 43, by which the damper 40 forms a spring strut. Here, the damper 40 may be attached by its upper attachment point on the damper piston 41 to the vehicle body. In its lower region, the damper 40 is supported by its damper tube 42 on the wheel carrier 20.

Likewise supported on the wheel carrier 20 is a lower transverse link 50 which is attached by its wheel-carrier-side end to the wheel carrier 20 by the joint 52. Here, the upper attachment point of the damper 40 and the articulated connection 52 define, in the case of a steerable axle, the steering axis SA, that is to say the axis about which the wheel 30 rotates during a steering movement.

The transverse link can be attached by its other end to the vehicle body via the joint 51, such that, in a functionally installed state of the axle 10 in a two-track vehicle, the wheel carrier 20 is supported on the vehicle body via the spring strut or the damper 40 and the lower transverse link 50.

In the case of the spring strut axle illustrated in FIG. 1, an occurring vertical wheel load $F_R$ causes a compression movement of the wheel 30. Here, the damper piston 41 is displaced into the damper tube 42 along the damper axis DA.

For the least possible friction and for optimum damper characteristics, it is important here for the damper piston 41 to be guided in the damper tube 42 as far as possible without transverse forces. To compensate the moment $M_{FR}$, generated by the wheel load $F_R$, about the attachment point 52, which moment arises owing to the lever x and generates a transverse force on the upper attachment point of the damper 40, the helical spring 43 is generally installed so as to be inclined relative to the steering axis SA. That is to say, a longitudinal axis TA of the helical spring 43 does not coincide with the steering axis SA, but rather is inclined relative to the steering axis SA in order to realize corresponding transverse force compensation.

Figure 2:
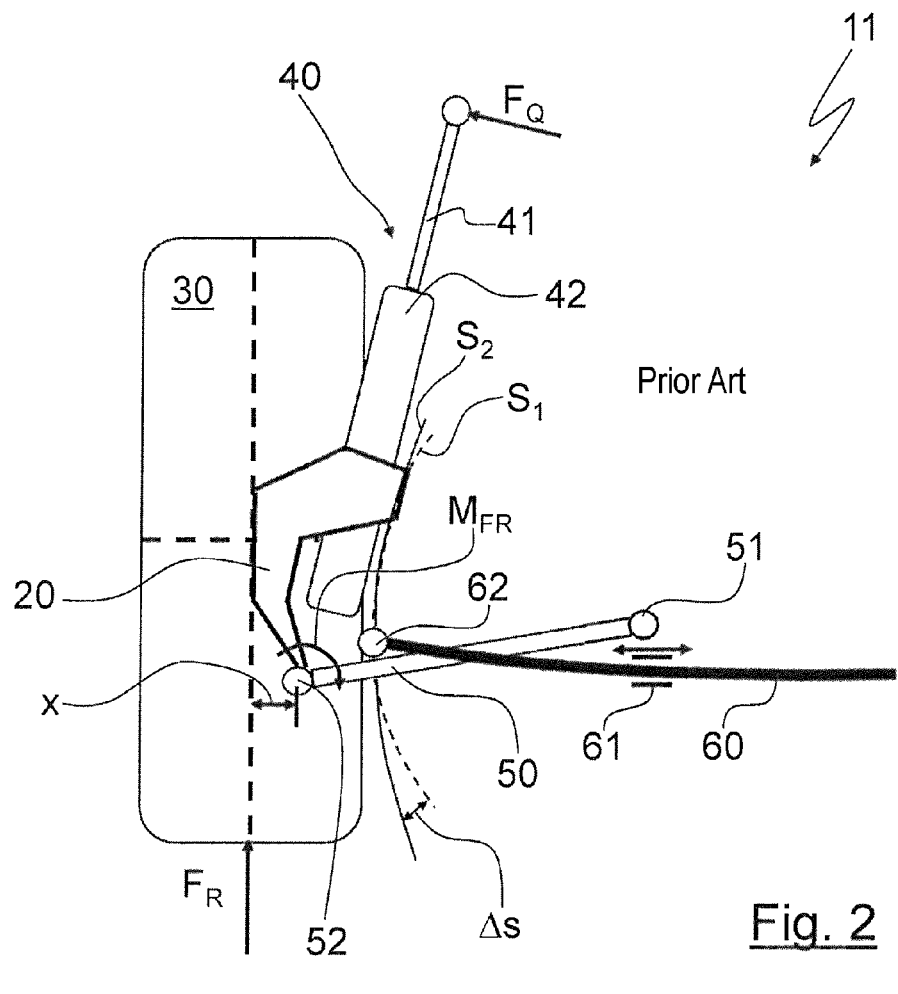

Spring strut axles, however, have the disadvantage that they require a high weight and have a not inconsiderable structural space requirement. Alternatives to spring strut axles are transverse leaf spring axles. These are likewise basically known from the prior art, wherein FIG. 2 shows a transverse leaf spring axle 11 which is basically known from the prior art. The transverse leaf spring axle 11 likewise has a wheel carrier 20 for controlling a wheel 30, and a damper 40 or a damper strut 40 with a damper tube 42 and a damper piston on the piston rod 41. The damper 40 is likewise supported, in the lower region of the damper tube 42, on the wheel carrier 20. The wheel carrier 20 may likewise be attached by a lower transverse link 50, which is attached by an articulated connection 52 to the wheel carrier, to the vehicle body, likewise by a joint 51.

In contrast to the spring strut axle shown in FIG. 1, this axle, however, does not have a helical spring 43, but a transverse leaf spring 60, which is attached by an articulated connection 62 to the lower transverse link 50. By the bearing 61, the transverse leaf spring 60 is attached to the vehicle body.

If a wheel load $F_R$ now occurs, this generates, owing to the lever x, a moment $M_{FR}$ about the joint 52, which moment is supported via the upper attachment point of the damper 40 with a transverse force $F_Q$, such that a transverse force $F_Q$ acts on the damper strut 40. That is to say, with the transverse leaf spring axle described in FIG. 2 and known from the prior art, the transverse force load on the damper strut 40 cannot be avoided, in particular cannot be compensated, in the manner that can be achieved by oblique positioning of the helical spring 43 in the case of the spring strut axle 10 described in FIG. 1.

A further problem in the case of the axle described in FIG. 2 consists in that, during the compression and/or rebound movements of the wheel 30, the articulated connection 62 kinematically follows both the movement of the transverse leaf spring 60 and the lower transverse link 50, even though the transverse link 50 and the end of the transverse leaf spring 60 actually move on different paths $S_1$ and $S_2$, because the transverse link 50 and the transverse leaf spring 60 rotate in each case about different attachment points. During the compression and rebound movements, the transverse link 50 moves about the joint 51 along the path $S_2$, and the transverse leaf spring 60, owing to the bending thereof, rotates about the bearing 61 on the path $S_1$, which is indicated here by dashed lines. The attachment point 61, however, does not coincide with the vehicle-side attachment point 51 of the transverse link 50.

Since the transverse leaf spring 60 is, however, rigidly connected to the transverse link 50 by the articulated connection 62 and the rigidity of the transverse link 50 is generally greater than the rigidity of the transverse leaf spring 60, the forces occurring during the compression and rebound movements generally cause a lengthening of the transverse leaf spring 60, such that the latter is forcibly guided along the path $S_2$, which can result in distortion of the transverse leaf spring 60 and, in part, also distortion of the vehicle body, which is intensified with increasing compression or rebound travel because, in this case, the path difference $\Delta s$ between the paths $S_2$ and $S_1$ increases. To achieve optimum driving behavior and to extend a service life of the transverse leaf spring 60 and of the bearing connections 61 and 62 as long as possible, it is, however, important that the transverse leaf spring 60 can move as far as possible without distortion during the compression and rebound movements.

To reduce the distortion of the transverse leaf spring 60, attributed to the different path curve profiles $S_1$ and $S_2$ of the transverse leaf spring 60 and of the transverse link 50 in the region of the articulated connection 62, during the compression and rebound movements, the articulated connection 62 may duly be formed with relatively low rigidity or so as to be flexible. This, however, comes at the expense of lateral force support.

Thus, with this axle, it is not possible, without additional measures, to simultaneously achieve optimum spring or bending characteristics of the transverse leaf spring 60, correspondingly support occurring lateral forces, and compensate transverse forces acting on the damper strut 40.

Figure 3:
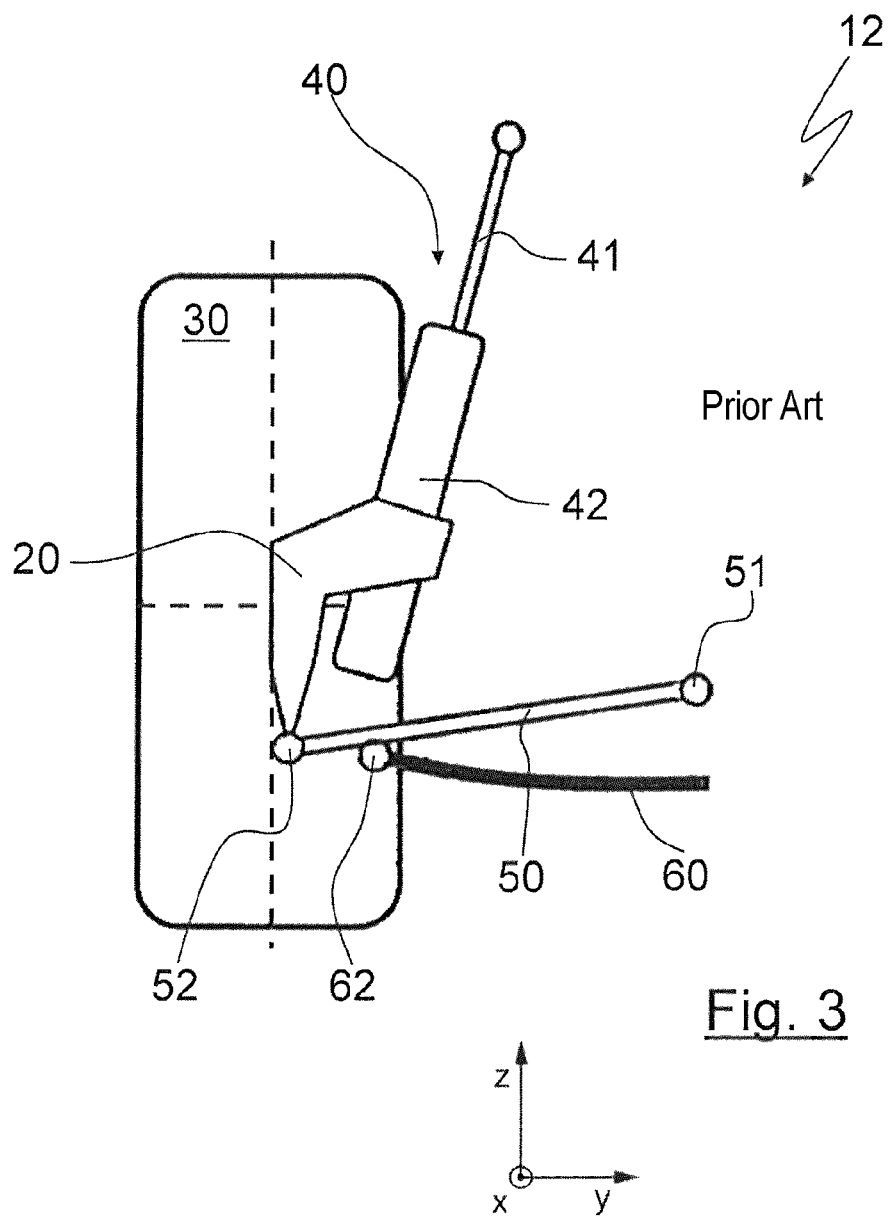

FIG. 3 shows an alternative embodiment of a transverse leaf spring axle 12 known from the prior art, wherein the axle 12 differs from the axle 11 shown in FIG. 2 in that the attachment point 52 of the lower transverse link 50 on the wheel carrier 20 is situated further toward the outside of the vehicle. This way, the lever x is considerably smaller and the transverse force acting on the damper piston 41 can be virtually completely compensated. This axle 12 thus duly permits transverse force compensation. However, even with this axle 12, support of the lateral forces cannot be achieved without additional measures or without distortion of the transverse leaf spring 60. Furthermore, it is often not possible, due to the lack of structural space, for the attachment point 52 to be relocated so far toward the outside.

Figure 4:
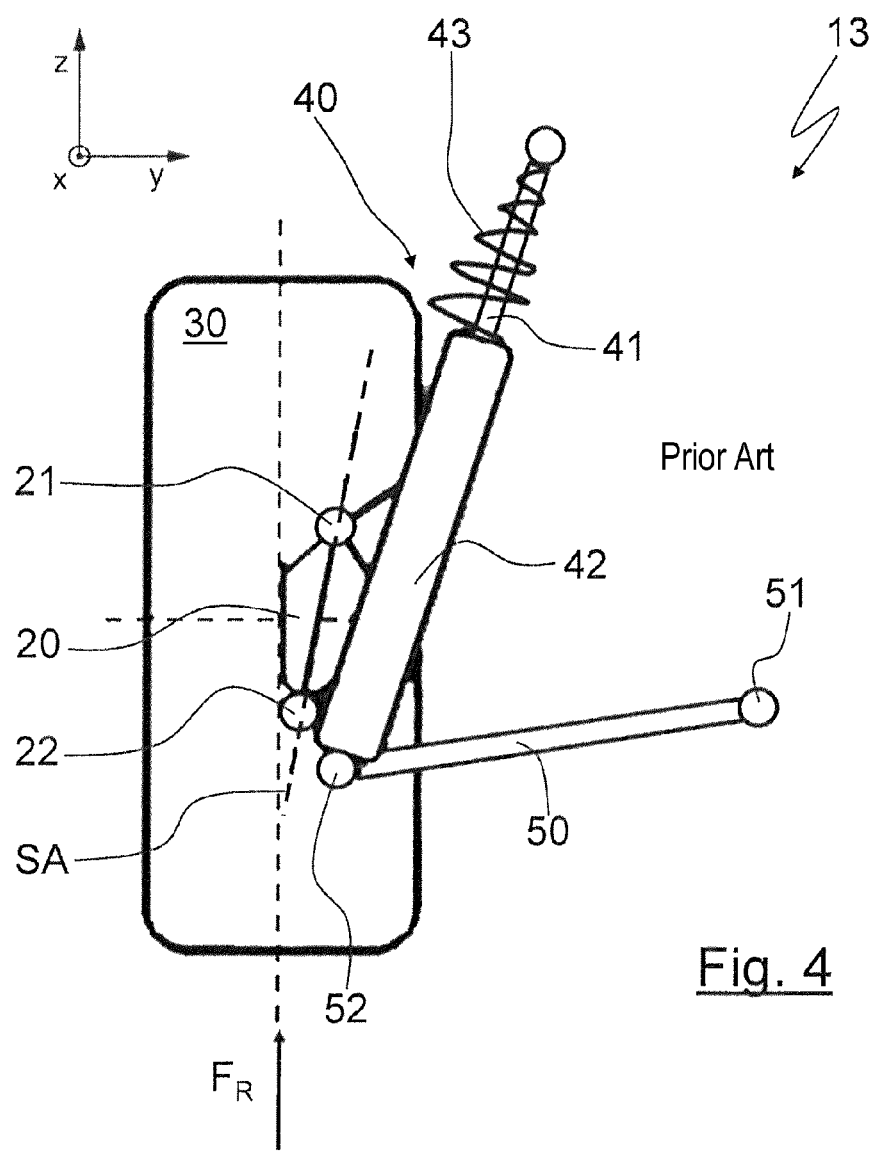

FIG. 4 shows a further example of an axle 13 known from the prior art, a so-called Revo-Knuckle axle 13, in the case of which the damper 40 or the spring strut is fastened to the wheel carrier 20, rotatably about the steering axis SA, by ball joints 21, 22. Owing to the attachment of the damper 40 by the two ball joint connections 21 and 22, it is duly no longer necessary for the damper to be attached rotatably to the vehicle body, because the damper is mounted rotatably on the wheel carrier. However, even with a Revo-Knuckle axle 13, the occurring transverse forces on the damper 40 cannot be reduced without the oblique positioning of a helical spring, and the structural space and weight advantages of a transverse leaf spring axle cannot be achieved.

Figure 5:
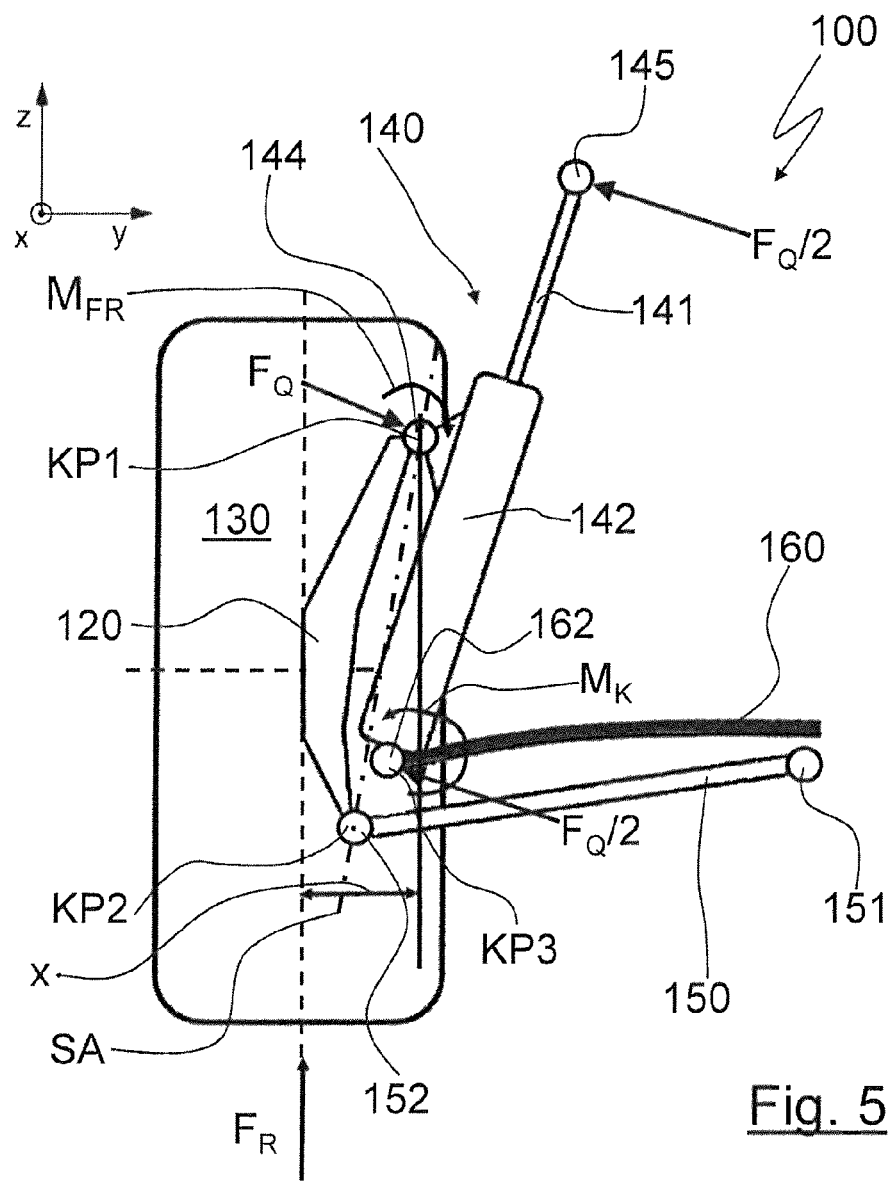
FIG. 5 shows a first embodiment of an axle according to the invention.

FIG. 5 shows a first embodiment of an axle 100 according to the invention for the wheels 130 of a two-track (or double-tracked) motor vehicle. The axle 100 has, on each side of the vehicle, a wheel carrier 120, a damper strut 140 with a damper tube 142 and with a damper piston 141, which damper piston has a piston rod and is movable along a damper longitudinal axis DA, a lower transverse link 150, and a transverse leaf spring 160.

The damper strut 140 is articulately attached at a first kinematic point KP1 to the wheel carrier 120 and can be attached by its upper end to the vehicle body by an articulated connection 145. Here, the damper strut 140 is supported on the wheel carrier 120 at the first effective kinematic point KP1.

Here, as is known from the prior art, the lower transverse link 150 is attached by an articulated connection 152 to the wheel carrier 120 and can be articulated by an articulated connection 151 on the vehicle body. Here, the articulated connection 152 defines a second effective kinematic point KP2, at which the transverse link 150 is supported on the wheel carrier 120.

The transverse leaf spring 160 is articulated on the lower end of the damper strut 140, likewise by an articulated connection 162, at a third kinematic point KP3, which transverse leaf spring is, by contrast to the axles known from the prior art, supported not on the wheel carrier 120 or on the transverse link 150, but on the damper strut 140 at the third kinematic point KP3.

In the case of an attachment of the transverse leaf spring 160 to the damper strut 140, an occurring wheel load $F_R$, in particular during compression and/or rebound movements, still gives rise to a moment $M_{FR}$, specifically about the first kinematic point KP1, owing to the lever x which is still present and which in this case is defined by the spacing of the first kinematic point KP1 from the wheel central plane. The resulting transverse force $F_Q$, however, no longer needs to be supported entirely at the upper attachment point of the damper strut 140, that is to say at the upper end 145 of the piston rod. Instead, it is possible for the transverse force $F_Q$ to be supported both by the attachment point 162, at which the transverse leaf spring 160 is supported on the damper strut 140, and also by the attachment point 145. In this way, the transverse force load in the damper strut 140 can be reduced overall, such that the damper friction can be reduced by an arrangement of the above-described type even in the case of a transverse leaf spring axle. By way of example, it has been assumed here that the transverse force $F_Q$ has been reduced approximately by half. This is self-evidently dependent on the lever ratios defined by the arrangement of the individual attachment points.

A further advantage of an axle 100 according to the invention is that, owing to the decoupling of the transverse leaf spring 160 from the transverse link 150, the end region of the transverse leaf spring 160 and the lower transverse link 150 can now move on different paths without generating distortion in the transverse leaf spring 160. In this way, the spring characteristic of the transverse leaf spring 160 and thus, in particular, the comfort characteristics of the axle 100 can be considerably improved.

In the embodiment shown in FIG. 5, the transverse leaf spring 160 is attached to the damper strut 140 by a joint 162 which is rigid in the y-direction, but which can be preloaded about an axis in the vehicle longitudinal direction with a counter moment $M_K$. Here, other attachment possibilities are self-evidently also contemplated, as shown, for example, in FIG. 6, in which the transverse leaf spring 260 is of angled design and itself forms a hinge joint by its angled end region.

Here, if the transverse leaf spring 260 is additionally attached to the damper strut 140 under preload, in particular under preload with a counter moment $M_K$ which at least partially counteracts a transverse force $F_Q$ generated owing to occurring wheel loads $F_R$ and directed toward the vehicle center and running through the first effective kinematic point KP1 and acting on the damper strut 140, the transverse force $F_Q$ acting on the damper piston 142 can be yet further reduced. Here, the preload is preferably selected such that complete transverse force compensation is realized in many driving situations.

Figure 6:
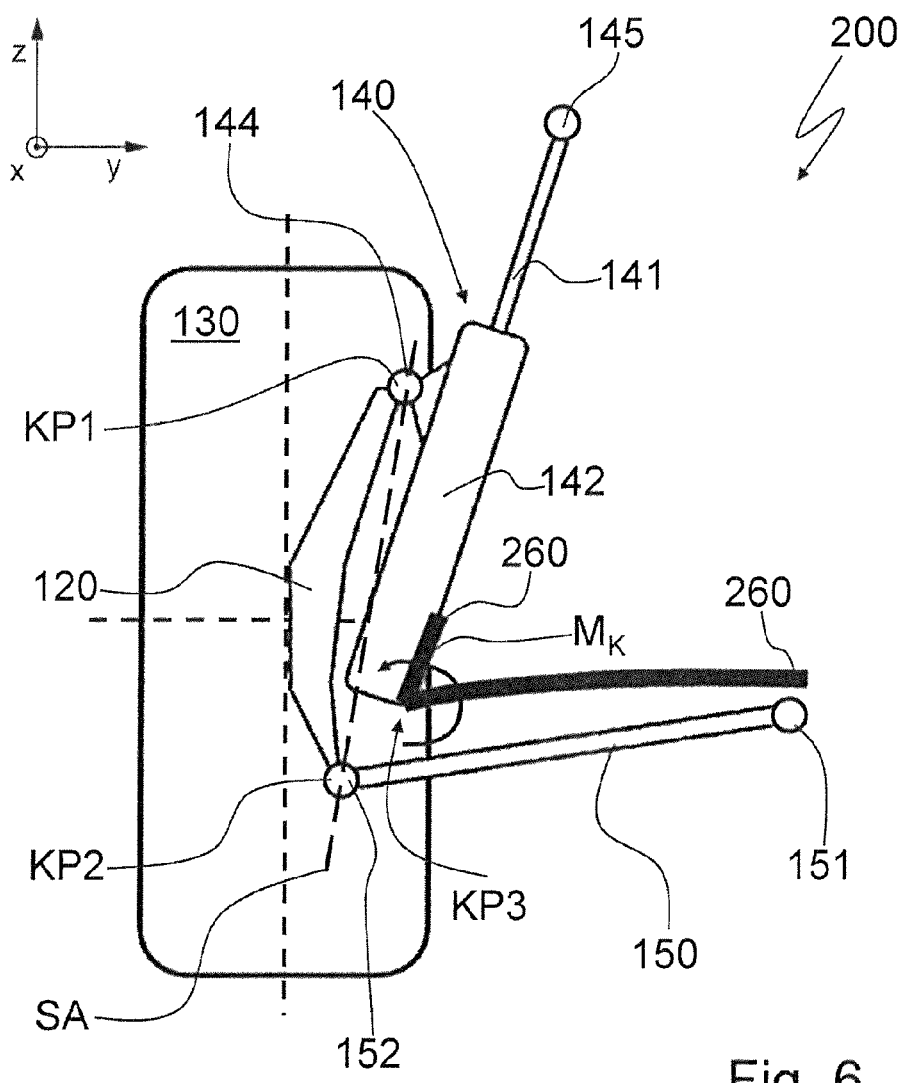
FIG. 6 shows a second embodiment of an axle according to the invention.
Figure 7:
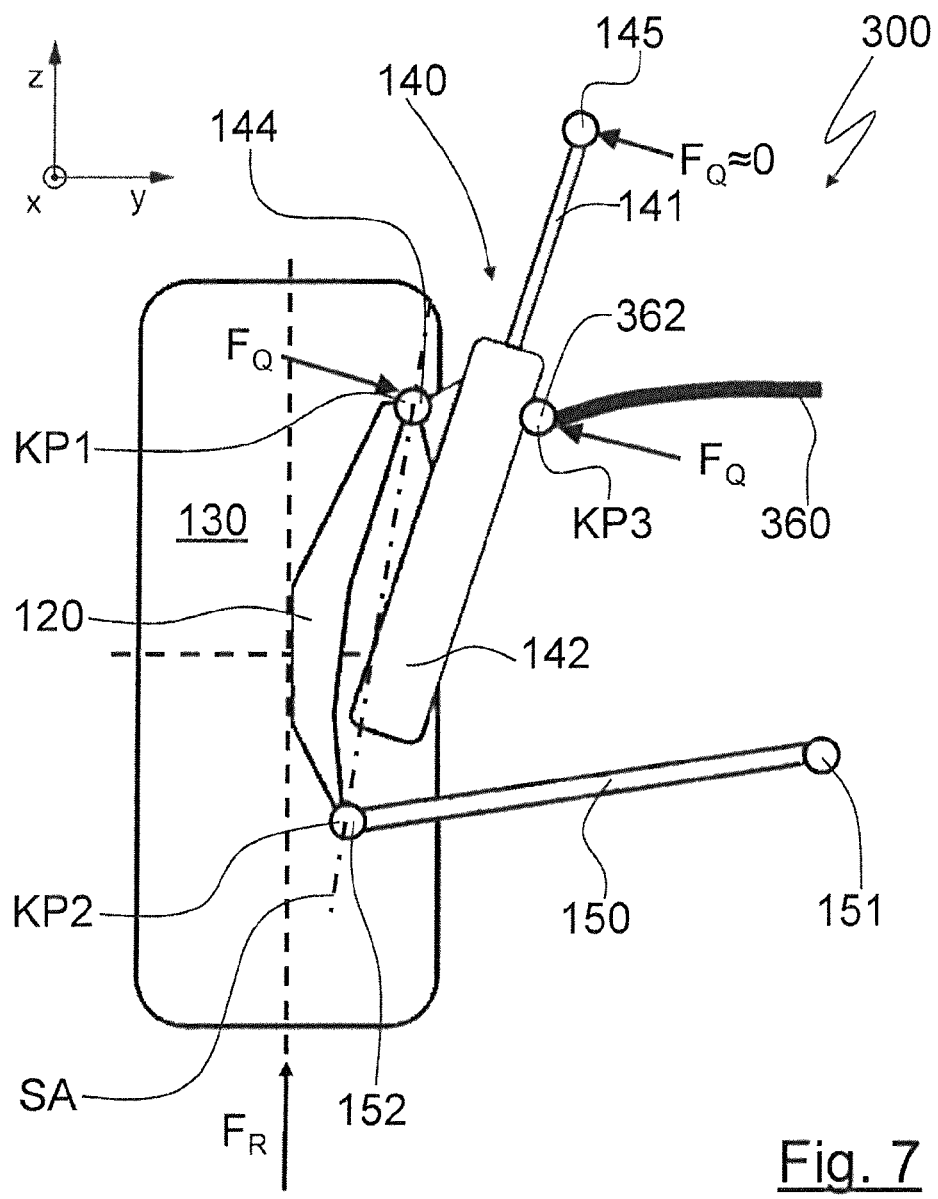
FIG. 7 shows a third embodiment of an axle according to the invention.

FIG. 7 shows a third embodiment of an axle 300 according to the invention, wherein, by contrast to the previous embodiments of an axle 100 and 200 according to the invention shown in FIGS. 5 and 6 respectively, the transverse leaf spring 360 is attached by a joint 362 to the damper strut 140 such that the third effective kinematic point KP3 is arranged at the height of the first effective kinematic point KP1, such that an occurring wheel load $F_R$ and a resulting transverse force $F_Q$ can be supported directly via the transverse leaf spring 360 and does not need to be supported via the piston rod of the damper strut 140. In this way, direct transverse force compensation can be made possible in a simple manner.

Figure 8:
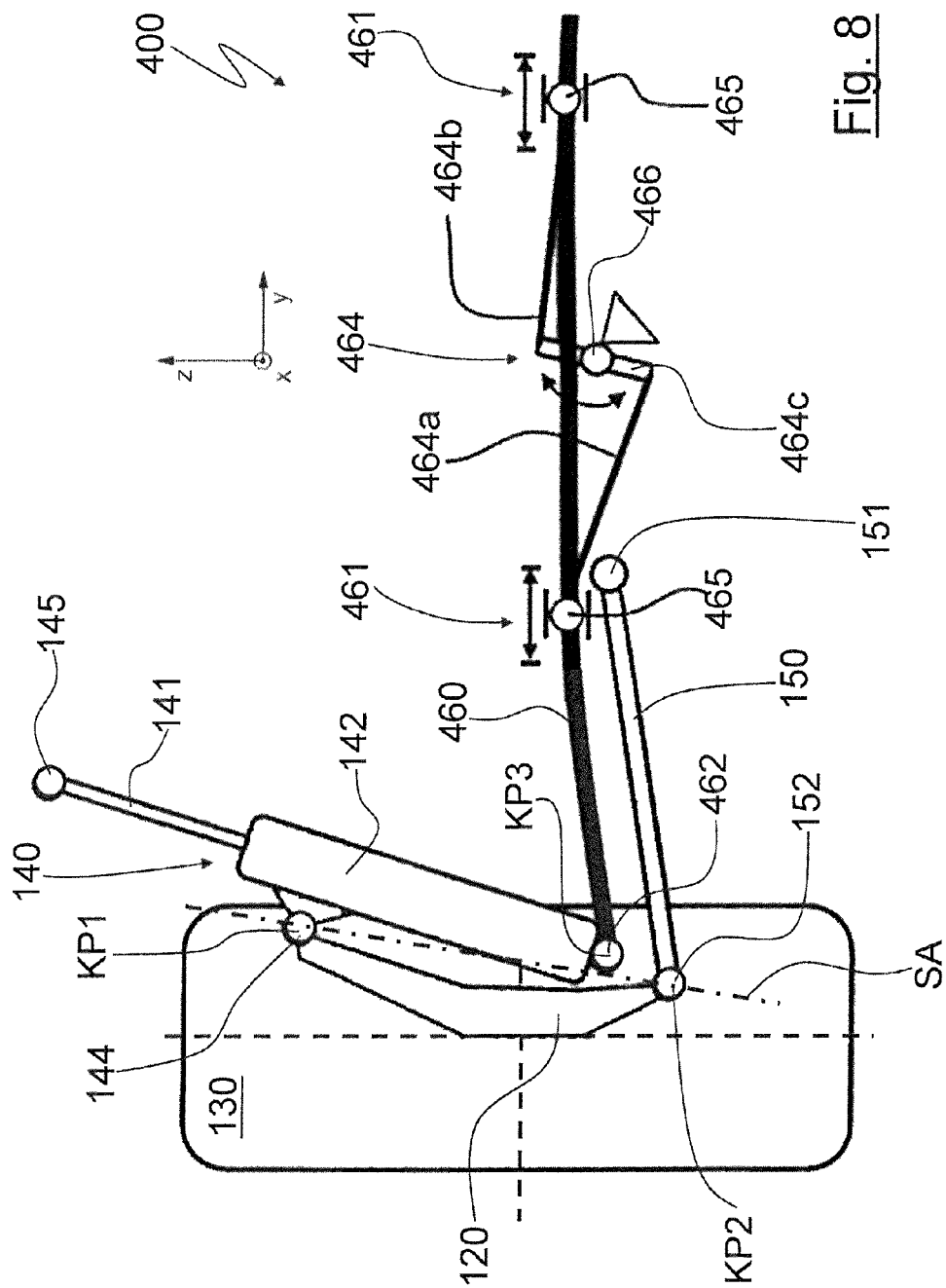
FIG. 8 shows a fourth embodiment of an axle according to the invention.

FIG. 8 shows a particularly preferred embodiment of an axle 400 according to the invention, wherein the axle shown in FIG. 8 corresponds substantially to the axle shown in FIG. 5, but has a transverse leaf spring 460. The transverse leaf spring 460 is attached flexibly in the vehicle transverse direction to the vehicle body, and additionally has a Watt linkage 464 for the support of occurring lateral forces via the transverse leaf spring 460.

The Watt linkage 464 has an intermediate lever 464c and two support levers 464a and 464b, and can be attached, rotatably about an axis in the vehicle longitudinal direction, to the vehicle body by a bearing 466. The support levers 464a and 464b are each connected, by ball joints, to the intermediate lever 464c. By the bearing 465, the Watt linkage 464 is articulately connected to the transverse leaf spring 460. The transverse leaf spring can likewise be attached to the vehicle body by the two bearings 461, which permit a compensation of the movement of the transverse leaf spring 460 in the vehicle transverse direction, but support the transverse leaf spring 460 in the vehicle vertical direction.

The Watt linkage 464 or the axle 400 is in this case designed such that a lateral force acting on the axle 400 does not result in a lateral displacement of the transverse leaf spring 460. That is to say, the kinematics of the Watt linkage 464 are configured such that the Watt linkage 464 blocks a global transverse movement, that is to say the lateral displacement, of the transverse leaf spring 460, such that lateral forces acting on the transverse leaf spring 460 can be supported via the Watt linkage 464 on the vehicle body.

The blockage of the Watt linkage 464 may be realized, for example, by virtue of the hinge joints, by which the intermediate lever 464c is connected to the support levers 464a and 464b, having a corresponding stop or being designed such that a transverse movement of the transverse leaf spring 460 is not possible.

This axle 400 according to the invention has the advantage in relation to the axles 100, 200 and 300 described in FIGS. 5 to 7 that, within certain limits, the movement of the transverse leaf spring 460 owing to bending of the transverse leaf spring 460 during compression and rebound movements can be compensated, but support of the lateral forces is realized by the Watt linkage 464. This is particularly advantageous from a driving dynamics aspect.

Figure 9:
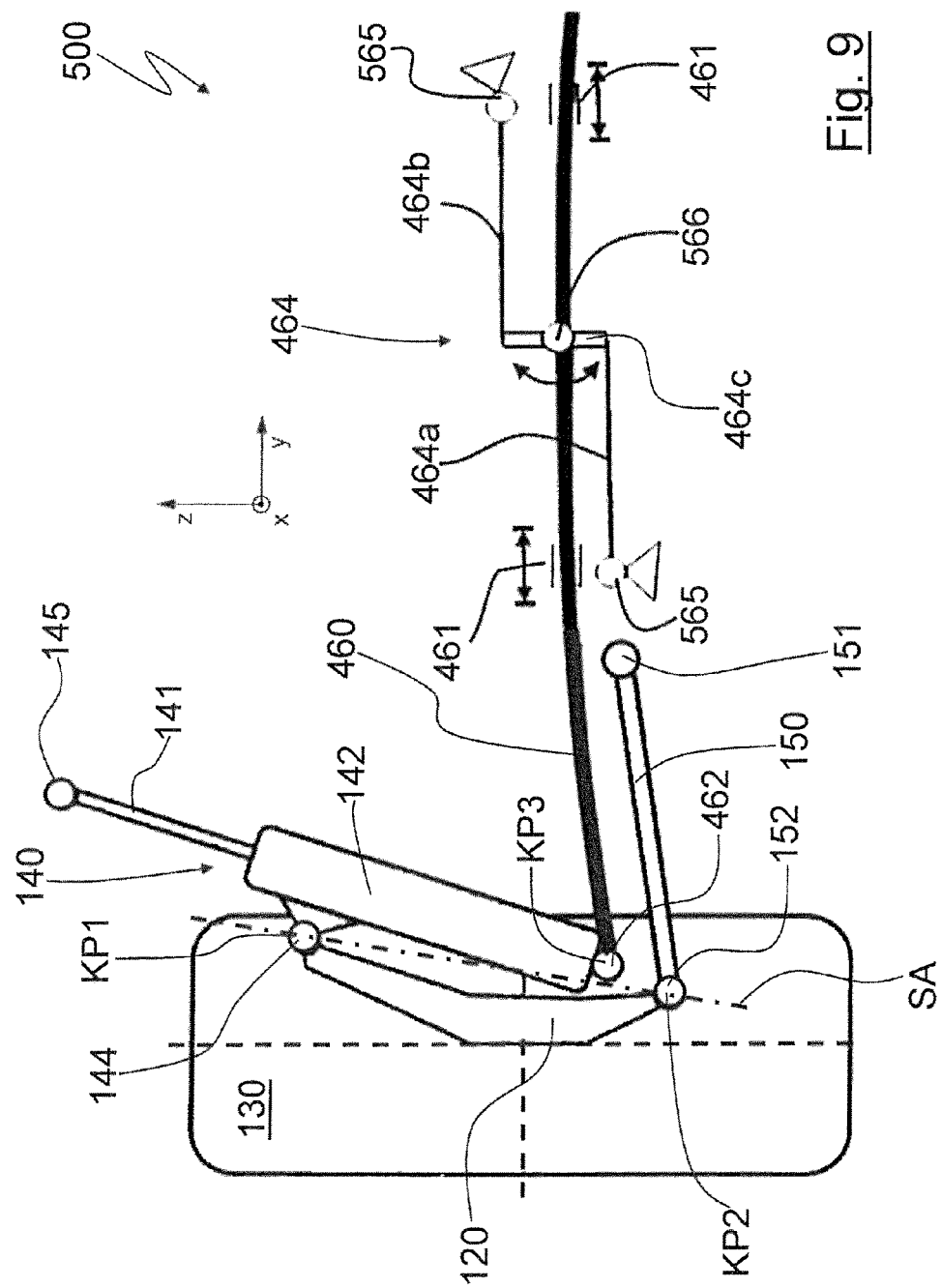
FIG. 9 shows a fifth embodiment of an axle according to the invention.

FIG. 9 shows a further embodiment of an axle 500 according to the invention, likewise with a Watt linkage 464. In this embodiment, the Watt linkage 464 is or can be attached differently to the transverse leaf spring 560 and to the vehicle body. Specifically, in this embodiment, the intermediate lever 464c of the Watt linkage 464 is attached, rotatably about an axis in the vehicle longitudinal direction, to the transverse leaf spring 560 by a joint 566, and not to the vehicle body as in the case of the axle 400 according to the invention described in FIG. 8.

Furthermore, the intermediate levers 464a and 464b are attached rotatably and articulately by the bearings 565 to the vehicle body and not to the transverse leaf spring 560. The transverse leaf spring 560 is, however, likewise formed by bearings 461 for attachment to the vehicle body. The bearings 461 likewise permit support of occurring forces in the vehicle vertical direction, but not in the vehicle transverse direction, and instead permit a compensation movement of the transverse leaf spring 560 in the vehicle transverse direction.

For detailed explanations relating to the mode of operation of the described Watt linkage, reference is made to DE 10 2014 223 600.2 (EM27932), filed on the same date by the same applicant, which was incorporated by express reference into the content of the description in the background and summary of the present invention.

Figure 10:
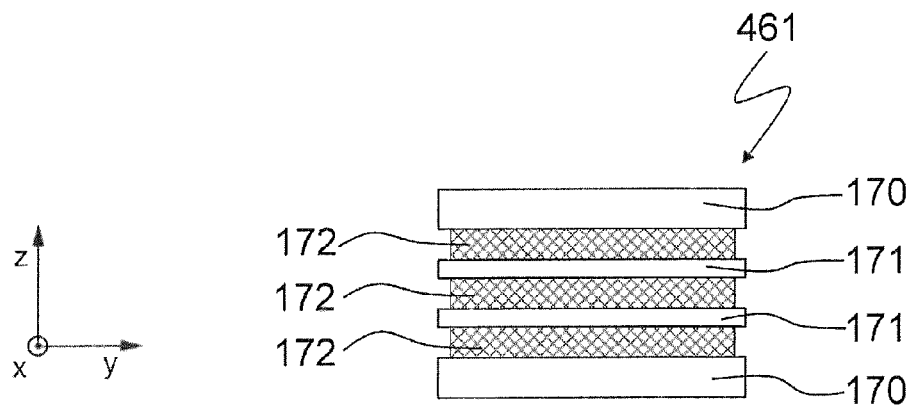
FIG. 10 shows a section through an embodiment of a bearing for the attachment of a transverse leaf spring of an axle according to the invention to the vehicle body in the rest state.

FIG. 10 schematically shows, in an orientation as per a functionally installed state, a section through an embodiment of an above-described bearing 461 (cf. FIGS. 8 and 9), which is particularly highly suitable for attachment of the transverse leaf spring 460 of an axle according to the invention to the vehicle body, and which is described in detail in DE 10 2014 223 576.6 (EM28004), filed on the same date by the same applicant, which is incorporated by express reference into the content of this description.

The bearing 461, illustrated by way of example for better understanding, is depicted in FIG. 10 in the rest state, that is to say without shear forces $F_Q$ acting on the bearing 461 in the longitudinal and transverse directions. The bearing 461 has an uppermost and a lowermost bearing layer 170 composed of metal, in this case composed of steel, which bearing layer is rigid in the vertical direction, longitudinal direction and transverse direction with regard to a functionally installed state of the bearing 461 in a vehicle. Furthermore, the bearing 461 has two intermediate layers 171 as bearing layers, which are likewise composed of metal and which are likewise rigid in the vertical direction, longitudinal direction and transverse direction. The bearing layers 172 which are arranged between the bearing layers 170, 171 composed of metal are formed from an elastomer and are formed so as to be flexible or soft in the transverse direction and soft in the longitudinal direction. Here, the metallic bearing layers 170, 171 are each fixedly connected to the adjacent elastomer layers 172. The layer thicknesses of the individual bearing layers are in this case selected such that the desired rigidities are realized in all three spatial directions.

Owing to the layered construction of the bearing 461 with bearing layers composed of metal 170, 171 and bearing layers composed of an elastomer 172, which are arranged one above the other in a sandwich-like alternating fashion and which act as elastic sliding planes, the bearing 461 exhibits a high level of elasticity in the transverse direction (y-direction) and in the longitudinal direction (x-direction) and is simultaneously rigid in the vertical direction (z-direction). The elastomer layers 172 arranged between the metal layers 170, 171 permit the shear movement, and the metal layers 170, 171 fixedly connected to the elastomer layers 172 impart corresponding rigidity in the vertical direction.

Here, the bearing 461 described by way of example is of substantially flat construction and has an approximately rectangular cross section in all three spatial planes. By virtue of the fact that the bearing 461 permits a shear movement in the longitudinal direction and transverse direction, it is possible in a functionally installed state of the bearing 461 for a movement of the transverse leaf spring 460 in the vehicle longitudinal direction and vehicle transverse direction to be compensated. In this way, distortion of the transverse leaf spring 460 owing to the bending during the compression and rebound movements can be prevented, and thus an improved spring characteristic of the transverse leaf spring 460, and thus improved driving feeling, can be achieved.

Figure 11:
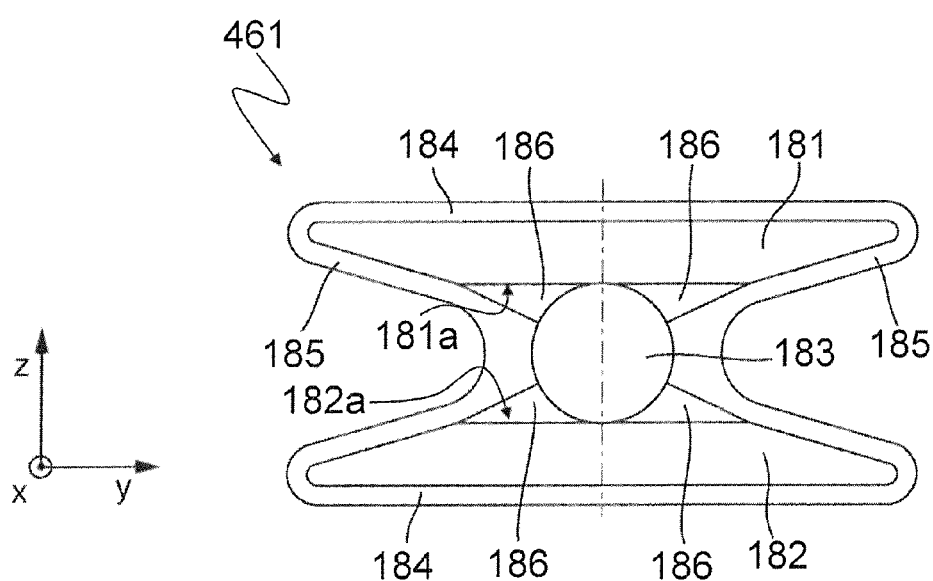
FIG. 11 shows a section through a further embodiment of a bearing for the attachment of a transverse leaf spring of an axle according to the invention to the vehicle body, likewise in the rest state.

FIG. 11 shows a section in the vehicle transverse direction through an alternative embodiment of a bearing 461, which is likewise particularly highly suitable for the attachment of the transverse leaf spring 460 of an axle according to the invention to the vehicle body and which is described in detail in DE 10 2014 223 584.7 (EM28029), filed on the same date by the same applicant, which is incorporated by express reference into the content of this description.

This embodiment of a bearing 461 in the form of a roller bearing, which is likewise illustrated in the orientation as per a functionally installed state, has an upper bearing plate 181 composed of metal, in this case composed of hardened steel, a lower bearing plate 182, likewise composed of hardened steel, and a cylindrical rolling body 183 in the form of a roller 183, which is arranged between the two bearing plates 181 and 182 and which is likewise formed from hardened steel. Here, the upper bearing plate 181 and the lower bearing plate 182 each have a contact surface 181a and 182a respectively facing toward the rolling body 183, on each of which contact surfaces the rolling body 183 can roll.

This roller bearing with a cylindrical roller 183 as rolling body 183 is, by contrast to the bearing shown in FIG. 10, a movable line bearing, in the case of which the rolling body 183 supports respectively occurring forces in the vertical direction, that is to say in the z-direction, or in the vehicle vertical direction with regard to a functionally installed state in a motor vehicle, on the upper bearing plate 181 and the lower bearing plate 182 in each case along a contact line which in this case runs perpendicular to the plane of the drawing or in the x-direction.

Since, as the rolling body 183 rolls on the contact surfaces 181a and 182a of the two bearing plates 181 and 182, the contact line moves in each case laterally, that is to say in this case in the y-direction, or in the vehicle transverse direction in a functionally installed state in a motor vehicle. A bearing of this type is also referred to as a movable line bearing.

On a side of the upper bearing plate 181 and of the lower bearing plate 182 facing away from the contact surface 181a or 182a respectively, the bearing has in each case one elastomer layer 184. The elastomer layer 184 is in this case formed such that, in a functionally installed state of the bearing in a motor vehicle, the elastomer layer permits a compensation of a change of a spacing of the two bearing plates 181 and 182 to one another and thus a compensation of a changing bearing height owing to a movement of the transverse leaf spring 460 and the resulting compensation movement of the bearing.

Furthermore, the bearing has, on each side, an elastomer 185 which, in this embodiment, is vulcanized onto the rolling body 183 and which secures the rolling body 183 so as to prevent it from falling out, in particular from falling out laterally. Here, the elastomer 185 does not need to be connected to the rolling body 183, but this is particularly advantageous.

In this embodiment, the elastomer layer 184, which permits a compensation of a change in the bearing height, and the elastomer 185, which connects the two bearing plates 181 and 182 to one another and which secures the rolling body 183 so as to prevent it from falling out, are formed in one piece, that is to say in an encircling fashion.

In this embodiment, both the contact surface 181a of the upper bearing plate 181 and the contact surface 182a of the lower bearing plate 182 are of planar form. Furthermore, the bearing has corresponding hollow intermediate spaces 186, such that the rolling of the rolling body 183 is not impeded by the elastomer 185, and a corresponding compensation movement of the bearing is made possible.

By virtue of the fact that the two bearing plates 181 and 182 are connected to one another in each case only by the elastomer 15, the bearing plates 181 and 182 can furthermore be tilted relative to one another. If the bearing is fastened by its bottom side, for example, to a transverse leaf spring and by its top side to the vehicle body, it is possible during a bending movement of the transverse leaf spring for the lower bearing plate 182 to follow the inclination of the transverse leaf spring. In this way, bending of the transverse leaf spring can be compensated even more effectively.

Figure 12:
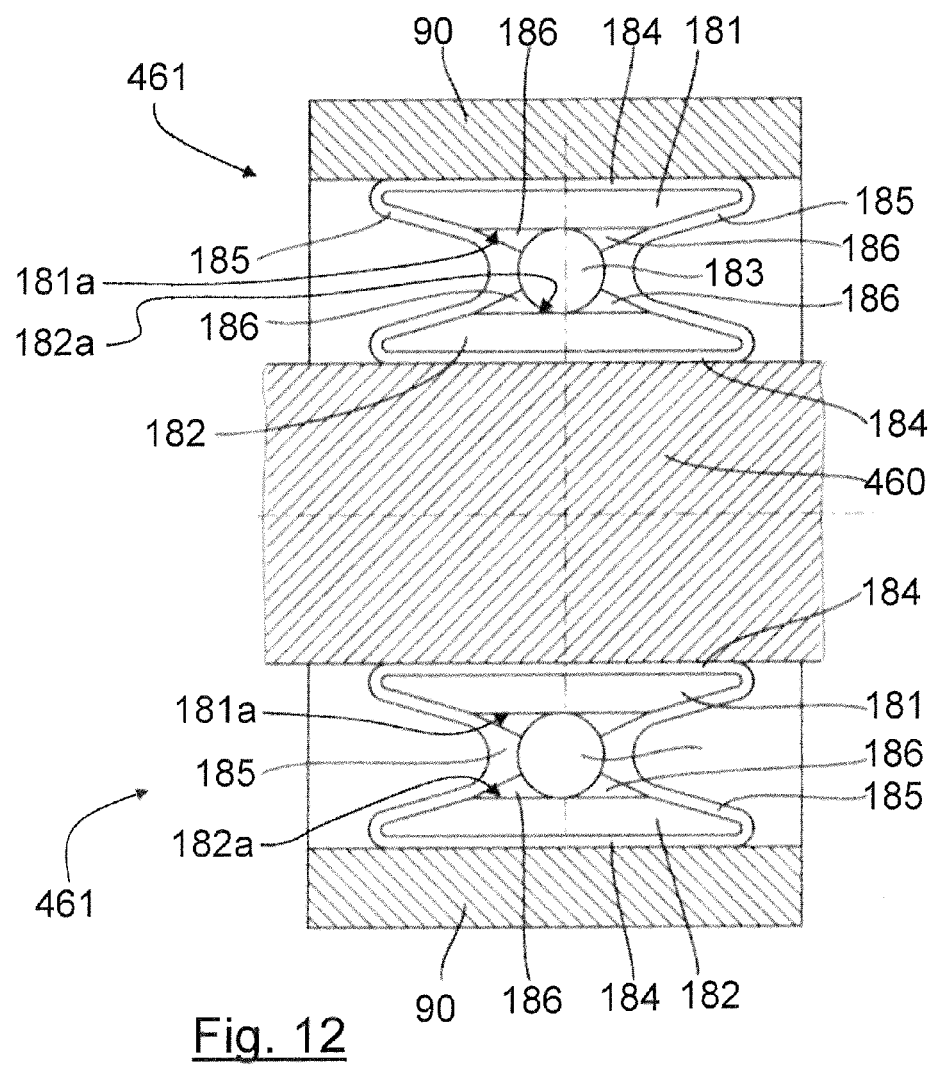
FIG. 12 shows an embodiment of the arrangement of the bearing for the attachment of the transverse leaf spring of an axle according to the invention to the vehicle body. Here, all of the features described in more detail may be essential to the invention.

FIG. 12 shows an embodiment of the arrangement of the bearing 461 for the attachment of the transverse leaf spring 460 of an axle according to the invention, wherein the arrangement will be discussed in more detail on the basis of the example of the bearing 461 described in FIG. 11. It is self-evidently also possible for other bearings to be arranged in this way, for example the bearing described in FIG. 10 or even other embodiments.

FIG. 12 shows, in an enlarged illustration, a section through an arrangement of the bearings 461 for the attachment of the transverse leaf spring 460, having a bearing pair with two bearings 461 arranged one above the other. For the attachment to the vehicle body, a holder 90 or a holding bracket 90 is provided which, in C-shaped fashion, surrounds the two bearings 461 and the transverse leaf spring 460 extending between the bearings and which can be fastened to the vehicle body (not illustrated). The C-shaped holding bracket 90 is preferably of correspondingly resilient or flexible design in order to compensate the "pumping" of the bearings that occurs in part in the case of some bearings, in particular in the case of the roller bearing described above, that is to say the change in the spacing in each case between the upper bearing plate 181 and the lower bearing plate 182 or the contact surfaces 181a and 182a thereof. With corresponding suitable design of the holding bracket 90, the elastomer layer 184 may in some cases even be dispensed with entirely.

Numerous modifications, in particular structural modifications, in relation to the embodiment discussed are self-evidently possible without departing from the content of the patent claims.

LIST OF REFERENCE DESIGNATIONS

10 MacPherson spring strut axle from the prior art
11 First embodiment of a transverse leaf spring axle known from the prior art
12 Second embodiment of a transverse leaf spring axle known from the prior art
13 Revo-Knuckle axle (Prior Art)
20 Wheel carrier
21 First attachment point of the spring strut to the wheel carrier
22 Second attachment point of the spring strut to the wheel carrier
30 Wheel
40 Damper
41 Damper piston
42 Damper tube
43 Helical spring or supporting spring
50 Lower transverse link
51 Vehicle-body-side attachment point of the transverse link
52 Wheel-carrier-side attachment point of the transverse link
60 Transverse leaf spring
61 Bearing for the attachment of the transverse leaf spring to the vehicle body
62 Attachment of the transverse leaf spring to the transverse link
100, 200, Axle according to the invention
300, 400, 500
120 Wheel carrier
130 Wheel
140 Damper strut
141 Damper piston
142 Damper tube
144 Attachment of the damper strut to the wheel carrier
145 Attachment of the damper strut to the vehicle body
150 Lower transverse link
151 Vehicle-body-side attachment point of the transverse link
152 Wheel-carrier-side attachment point of the transverse link
160, 260, Transverse leaf spring
360, 460, 560
461 Bearing for the attachment of the transverse leaf spring to the vehicle body
162, 362, Attachment of the transverse leaf spring to the damper strut
462
464a Support lever of the Watt linkage
464b Support lever of the Watt linkage
464c Intermediate lever of the Watt linkage
465 Attachment of the support lever to the transverse leaf spring
466 Attachment of the intermediate lever to the vehicle body
565 Attachment of the support lever to the vehicle body
566 Attachment of the intermediate lever to the transverse leaf spring
DA Damper longitudinal axis
$F_R$ Wheel load
$F_Q$ Transverse force
KP1 First effective kinematic point
KP2 Second effective kinematic point
KP3 Third effective kinematic point
$M_{FR}$ Transverse-force-generating moment induced by wheel load
$M_K$ Counter moment
TA Supporting spring axis
$S_1$ Actual path of the transverse leaf spring end
$S_2$ Path of the transverse link at the attachment point 62
SA Steering axis
x Wheel load lever arm
Δs Path difference The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An axle for wheels of a two-track motor vehicle, the axle, on each side of the vehicle, comprising:
   a wheel carrier;
   a damper strut;
   a transverse link; and
   a transverse leaf spring configured to impart an at least partial wheel-controlling action laterally and/or in a vehicle longitudinal direction,
   wherein the damper strut has a damper tube and a damper piston which is movable in the damper tube along a damper longitudinal axis,
   wherein the damper strut is attached by the damper tube to the wheel carrier and is supported at a first effective kinematic point on the wheel carrier,
   wherein the transverse link has a wheel-carrier-side end region and is attached by the wheel-carrier-side end region to the wheel carrier and is supported at a second effective kinematic point on the wheel carrier,
   wherein, with regard to a functionally installed state of the axle in the two-track motor vehicle, the transverse leaf spring extends substantially in a vehicle transverse direction and has at least one wheel-carrier-side end region,
   wherein the transverse leaf spring is attached by its wheel-carrier-side end region to the damper strut and is supported at a third effective kinematic point on the damper strut,
   wherein the damper strut is attached by the damper tube under preload to the wheel carrier, and
   wherein, with regard to a functionally installed state of the axle in the vehicle, the damper strut is attached to the wheel carrier under preload with a counter moment which acts about a vehicle longitudinal axis and which at least partially counteracts a transverse force generated by wheel loads and directed toward a vehicle center and running through the first effective kinematic point and acting on the damper strut.

2. The axle according to claim 1, wherein the transverse leaf spring is attached by its wheel-carrier-side end region to the damper strut in the region of the damper tube.

3. The axle according to claim 2, wherein the transverse leaf spring is attached to the damper strut in the region of a lower end of the damper tube or in the region of an upper end of the damper tube.

4. The axle according to claim 1, wherein in a vehicle vertical direction, the transverse leaf spring is attached to the damper strut at the level of the first effective kinematic point.

5. The axle according to claim 3, wherein in a vehicle vertical direction the transverse leaf spring is attached to the damper strut at the level of the first effective kinematic point.

6. The axle according to claim 4, wherein the third kinematic point is situated at a height of the first kinematic point.

7. The axle according to claim 1, wherein the transverse leaf spring is attached under preload to the damper strut.

8. The axle according to claim 7, wherein, the transverse leaf spring is attached to the damper strut under preload with a counter moment which acts about the vehicle longitudinal axis and which at least partially counteracts the transverse force generated owing to occurring wheel loads and directed toward the vehicle center and running through the first effective kinematic point and acting on the damper strut.

9. The axle according to claim 6, wherein the transverse leaf spring is attached under preload to the damper strut.

10. The axle according to claim 9, wherein the transverse leaf spring is attached to the damper strut under preload with a counter moment which acts about the vehicle longitudinal axis and which at least partially counteracts the transverse force generated by wheel loads and directed toward the vehicle center and running through the first effective kinematic point and acting on the damper strut.

11. The axle according to claim 1, wherein the transverse leaf spring is articulately attached to the damper strut.

12. The axle according to claim 11, wherein the transverse leaf spring is articulately attached to the damper strut by a joint.

13. The axle according to claim 12, wherein the joint is a ball joint or a rotary joint which permits an attachment under preload.

14. The axle according to claim 12, wherein the joint is a ball joint or a rotary joint which permits an attachment under preload with a counter moment which acts about the vehicle longitudinal axis and which at least partially counteracts the transverse force generated by wheel loads and directed toward the vehicle center and running through the first effective kinematic point and acting on the damper strut.

15. The axle according to claim 11, wherein
the transverse leaf spring is attached to the damper strut by a joint,
the transverse leaf spring itself forms the joint, and
the wheel-carrier-side end region of the transverse leaf spring is in the form of the joint.

16. The axle according to claim 1, wherein
the axle on each side of the vehicle has one wheel carrier and one damper strut on each side of the vehicle and one Watt linkage which is coupled to the transverse leaf spring and which is coupleable to the vehicle body,
the two damper struts are coupled to one another by the transverse leaf spring,
the transverse leaf spring is attachable by at least one bearing to the vehicle body,
the at least one bearing is configured for supporting the transverse leaf spring in a vehicle vertical direction and simultaneously permits a compensation of a movement of the transverse leaf spring in the vehicle transverse direction during compression and/or rebound movements, and
the Watt linkage is configured to be coupled to the transverse leaf spring, and be coupleable to the vehicle body, such that, in a functionally installed state of the axle in the vehicle, the Watt linkage at least one of prevents a movement of the transverse leaf springs in the vehicle transverse direction caused by forces acting on the transverse leaf springs, and limits the movement to a predefined maximum admissible transverse movement.

17. A two-track motor vehicle having an axle according to claim 1.

* * * * *